United States Patent
Kim (10) Patent No.: US 11,985,312 B2
(45) Date of Patent: *May 14, 2024

(54) IMAGE ENCODING/DECODING METHOD AND DEVICE USING INTRA PREDICTION

(71) Applicant: GUANGDONG OPPO MOBILE TELECOMMUNICATIONS CORP., LTD., Guangdong (CN)

(72) Inventor: Ki Baek Kim, Daejeon (KR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/295,811

(22) Filed: Apr. 4, 2023

(65) Prior Publication Data

US 2023/0247196 A1    Aug. 3, 2023

Related U.S. Application Data

(63) Continuation of application No. 17/457,969, filed on Dec. 7, 2021, now Pat. No. 11,652,988, which is a
(Continued)

(30) Foreign Application Priority Data

Apr. 1, 2018 (KR) .......................... 10-2018-0037811

(51) Int. Cl.
*H04N 19/11* (2014.01)
*H04N 19/119* (2014.01)
(Continued)

(52) U.S. Cl.
CPC .......... *H04N 19/11* (2014.11); *H04N 19/119* (2014.11); *H04N 19/176* (2014.11); *H04N 19/186* (2014.11); *H04N 19/593* (2014.11)

(58) Field of Classification Search
CPC .................................................. H04N 19/186
See application file for complete search history.

(56) References Cited

U.S. PATENT DOCUMENTS 9,374,582 B2  6/2016  Oh et al.
9,432,668 B1  8/2016  Bossen
(Continued)

FOREIGN PATENT DOCUMENTS

CN  103096066 A  5/2013
CN  103891283 A  6/2014
(Continued)

OTHER PUBLICATIONS

Vadim et al, "Neighbor based intra most probable modes list derivation", JVET-C0055, May 26, 2016. 4 pages.
(Continued)

*Primary Examiner* — Jerry T Jean Baptiste
(74) *Attorney, Agent, or Firm* — PERKINS COIE LLP (57) ABSTRACT

The image encoding/decoding method and device according to the present invention may determine an intra prediction mode of a current block and perform intra prediction on the current block on the basis of the intra prediction mode, wherein the intra prediction mode of the current block is determined for each of a luminance block and a color difference block.

20 Claims, 5 Drawing Sheets

Related U.S. Application Data continuation of application No. 17/042,432, filed as application No. PCT/KR2019/003776 on Apr. 1, 2019, now Pat. No. 11,233,992.

(51) Int. Cl.
  *H04N 19/176* (2014.01)
  *H04N 19/186* (2014.01)
  *H04N 19/593* (2014.01)

(56) References Cited

U.S. PATENT DOCUMENTS

| | | | |
|---|---|---|---|
| 9,813,712 | B2 | 11/2017 | Oh et al. |
| 9,866,836 | B2 | 1/2018 | Oh et al. |
| 10,045,027 | B2 | 8/2018 | Oh et al. |
| 11,445,179 | B2 * | 9/2022 | Lee .............. H04N 19/10 |
| 2014/0314142 | A1 | 10/2014 | Oh et al. |
| 2016/0261866 | A1 | 9/2016 | Oh et al. |
| 2016/0261867 | A1 | 9/2016 | Oh et al. |
| 2016/0277762 | A1 * | 9/2016 | Zhang .............. H04N 19/593 |
| 2017/0332084 | A1 * | 11/2017 | Seregin ............ H04N 9/8045 |
| 2018/0048889 | A1 | 2/2018 | Zhang et al. |
| 2018/0063532 | A1 | 3/2018 | Oh et al. |
| 2018/0063553 | A1 | 3/2018 | Zhang et al. |
| 2018/0309994 | A1 | 10/2018 | Oh et al. |
| 2019/0075328 | A1 | 3/2019 | Huang et al. |
| 2019/0215512 | A1 * | 7/2019 | Lee .............. H04N 19/91 |
| 2019/0222837 | A1 | 7/2019 | Lee et al. |
| 2020/0021804 | A1 * | 1/2020 | Jun .............. H04N 19/593 |
| 2020/0036985 | A1 * | 1/2020 | Jang .............. H04N 19/186 |
| 2020/0112750 | A1 | 4/2020 | Huang et al. |
| 2021/0092396 | A1 | 3/2021 | Zhang et al. |

FOREIGN PATENT DOCUMENTS

| | | |
|---|---|---|
| KR | 10-1336578 B1 | 12/2013 |
| KR | 10-2014-0090154 A | 7/2014 |
| KR | 10-2017-0111473 A | 10/2017 |
| KR | 10-2018-0014675 A | 2/2018 |
| WO | 2017157249 A1 | 9/2017 |
| WO | 2017222237 A1 | 12/2017 |
| WO | 2018016823 A1 | 1/2018 |
| WO | 2018/035130 A1 | 2/2018 |
| WO | 2020053805 A1 | 3/2020 |

OTHER PUBLICATIONS

Xiaoran Cao et al, and "CE6.b Report on Short Distance Intra Prediction Method", JCTVC-D299. Jan. 20, 2011. 8 pages.
Office Action of the Indian application No. 202017044822, dated Aug. 17, 2021. pages with English translations.
First Office Action of the Korean application No. 10-2020-7000411, dated Aug. 6, 2021. 8 pages with English translation.
Kai Zhang,et,al. "Enhanced Cross-component Linear Model Intra-prediction", Joint Video Exploration Team (JVET) of ITU-T SG 16 WP 3 and ISO/IEC JTC 1/SC 29/VVG 11, Document: JVET-D0110, 4th Meeting: Chengdu, CN, Oct. 15-21, 2016. 6 pages.
First Office Action of the Chinese application No. 202110276753.5, dated Nov. 30, 2022. 20 pages with English translation.
International Search Report dated Jul. 3, 2019 in counterpart International Patent Application No. PCT/KR2019/003776 (3 pages in English and 3 pages in Korean).
Alshina et al. Description of Exploration Experiments on Coding Tools, 116 MPEG Meeting, Chengdu, Oct. 14-16, 2016. 14 pages.
Chiu, Y. et al. "CE6a: Modified down-sampling for LM mode of intra chroma prediction" JCT-VC Meeting, Geneva, Nov. 21-30, 2011. 6 pages.
EPO, Partial Supplementary European Search Report for European Patent Application No. 19780794.4. dated Mar. 18, 2021. 16 pages.
Bross, B. et al. "WD4: the Working Draft 4 of High-Efficiency Video Coding" the JCTVC-803. 2011. 216 pages.
EPO, Extended European Search Report for European Patent Application No. 19780794.4. dated Jun. 21, 2021. 16 pages.
KIPO, Notification of Reason for Refusal for Korean Patent Application No. 10-2020-7000411. dated Jun. 12, 2020. 10 pages with English translation.
Wang, B. et al. "CE-3 Related: a unified MPM list for intra mode coding" JVET-N185, version 6, 2019. 3 pages.
Written Opinion of the International Search Authority in the international application No. PCT/KR2019/003776, dated Jul. 3, 2019. 9 pages with English translation.
Geert Van der Auwera, "Description of Core Experiment 3: Intra Prediction and Mode Coding," (JCTVC-J1023. version 3, Jun. 20, 2018). 44 pages.
Benjamin Bross, "Versatile Video Coding (Draft 4)," (JCTVC-M1001 version 7, Mar. 17, 2019). 300 pages.
Second Office Action of the Korean application No. 10-2020-7000411, dated Nov. 16, 2021. 10 pages with English translation.
First Office Action of the U.S. Appl. No. 17/042,432, dated May 11, 2021.
Notice of Allowance of the U.S. Appl. No. 17/042,432, dated Sep. 8, 2021.
Corrected Notice of Allowance of the U.S. Appl. No. 17/042,432, dated Nov. 10, 2021.
Corrected Notice of Allowance of the U.S. Appl. No. 17/042,432, dated Dec. 14, 2021.
First Office Action of the U.S. Appl. No. 17/457,969, dated Oct. 27, 2022.
Notice of Allowance of the U.S. Appl. No. 17/457,969, dated Jan. 9, 2023.
Corrected Notice of Allowance of the U.S. Appl. No. 17/457,969, dated Mar. 13, 2023.
Notice of Allowance of the Chinese application No. 202110276753. 5, dated Apr. 5, 2023. 5 pages with English translation.
First Office Action of the U.S. Appl. No. 18/295,801, dated Oct. 25, 2023. 37 pages.
Final Office Action of the U.S. Appl. No. 18/295,801, dated Dec. 22, 2023. 8 pages.
First Office Action of the U.S. Appl. No. 18/295,818, dated Oct. 26, 2023. 29 pages.
Notice of Allowance of the U.S. Appl. No. 18/295,818, dated Dec. 28, 2023. 9 pages.

* cited by examiner

IMAGE ENCODING/DECODING METHOD AND DEVICE USING INTRA PREDICTION

CROSS-REFERENCE TO RELATED APPLICATION(S)

This application is a continuation application of U.S. patent application Ser. No. 17/457,969, filed Dec. 7, 2021, which is a continuation application of U.S. patent application Ser. No. 17/042,432, filed Sep. 28, 2020, now U.S. Pat. No. 11,233,992, issued Jan. 25, 2022, which is a 371 National Stage of International Application No. PCT/KR2019/003776, filed Apr. 1, 2019, which claims the benefit under 35 U.S.C. 119(a) and 365(b) of Korean Patent Application No. 10-2018-0037811, filed Apr. 1, 2018, the entire disclosures of which are incorporated by herein by reference for all purposes.

TECHNICAL FIELD

The present invention relates to an image encoding/decoding method and apparatus.

BACKGROUND

Recently, demand for high-resolution and high-quality images such as high definition (HD) images and ultra high definition (UHD) images is increasing in various application fields, and accordingly, high-efficiency image compression techniques are being discussed.

Various technologies exist, such as the inter prediction technology that predicts pixel values included in a current picture from a picture before or after a current picture using video compression technology, the intra prediction technology that predicts pixel values included in a current picture by using pixel information in a current picture, an entropy encoding technology that allocates a short code to a value with a high frequency of appearance and a long code to a value with a low frequency of appearance. Image data can be effectively compressed by using such image compression technology, and transmitted or stored.

DISCLOSURE

Technical Problem

An object of the present invention is to provide a method and apparatus for deriving an intra prediction mode.

An object of the present invention is to provide an intra prediction method and apparatus according to component types.

An object of the present invention is to provide a block division method and apparatus for intra prediction.

Technical Solution

The image encoding/decoding method and apparatus of the present invention may determine an intra prediction mode of a current block and perform intra prediction on a current block based on the determined intra prediction mode.

In the image encoding/decoding method and apparatus of the present invention, the intra prediction mode of the current block may be derived for a luma block and a chroma block, respectively.

In the image encoding/decoding method and apparatus of the present invention, an intra prediction mode of a luma block is derived based on an MPM list and an MPM index, and the MPM list may include at least one of an intra prediction mode of a neighboring block (ModeA), ModeA+n, ModeA−n, or a default mode.

In the image encoding/decoding method and apparatus of the present invention, the current block is any one of a plurality of lower coding blocks belonging to a higher coding block, and a plurality of lower coding blocks belonging to the higher coding block may share the MPM list.

An image encoding/decoding method and apparatus of the present invention may specify a luma region for inter-components reference of a chroma block, perform down-sampling for the luma region, derive a parameter for inter-components reference of the chroma block, and predict the chroma block based on the down-sampled luma block and the parameter.

In the image encoding/decoding method and apparatus of the present invention, the current block is divided into a plurality of sub-blocks, and the division may be performed based on at least one of a size or a shape of the current block.

Advantageous Effects

According to the present invention, prediction may be more accurately and efficiently performed by deriving an intra prediction mode based on an MPM list.

According to the present invention, it is possible to improve the efficiency of inter prediction based on inter-components reference.

The present invention may improve the efficiency of intra prediction encoding/decoding through adaptive block division.

BEST MODE FOR INVENTION

The image encoding/decoding method and apparatus of the present invention may determine an intra prediction mode of a current block and perform intra prediction on a current block based on the determined intra prediction mode.

In the image encoding/decoding method and apparatus of the present invention, the intra prediction mode of the current block may be derived for a luma block and a chroma block, respectively.

In the image encoding/decoding method and apparatus of the present invention, an intra prediction mode of a luma block is derived based on an MPM list and an MPM index, and the MPM list may include at least one of an intra prediction mode of a neighboring block (ModeA), ModeA+n, ModeA−n, or a default mode.

In the image encoding/decoding method and apparatus of the present invention, the current block is any one of a plurality of lower coding blocks belonging to a higher coding block, and a plurality of lower coding blocks belonging to the higher coding block may share the MPM list.

An image encoding/decoding method and apparatus of the present invention may specify a luma region for inter-components reference of a chroma block, perform down-sampling for the luma region, derive a parameter for inter-components reference of the chroma block, and predict the chroma block based on the down-sampled luma block and the parameter.

In the image encoding/decoding method and apparatus of the present invention, the current block is divided into a plurality of sub-blocks, and the division may be performed based on at least one of a size or a shape of the current block.

MODE FOR INVENTION

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

Figure 1:
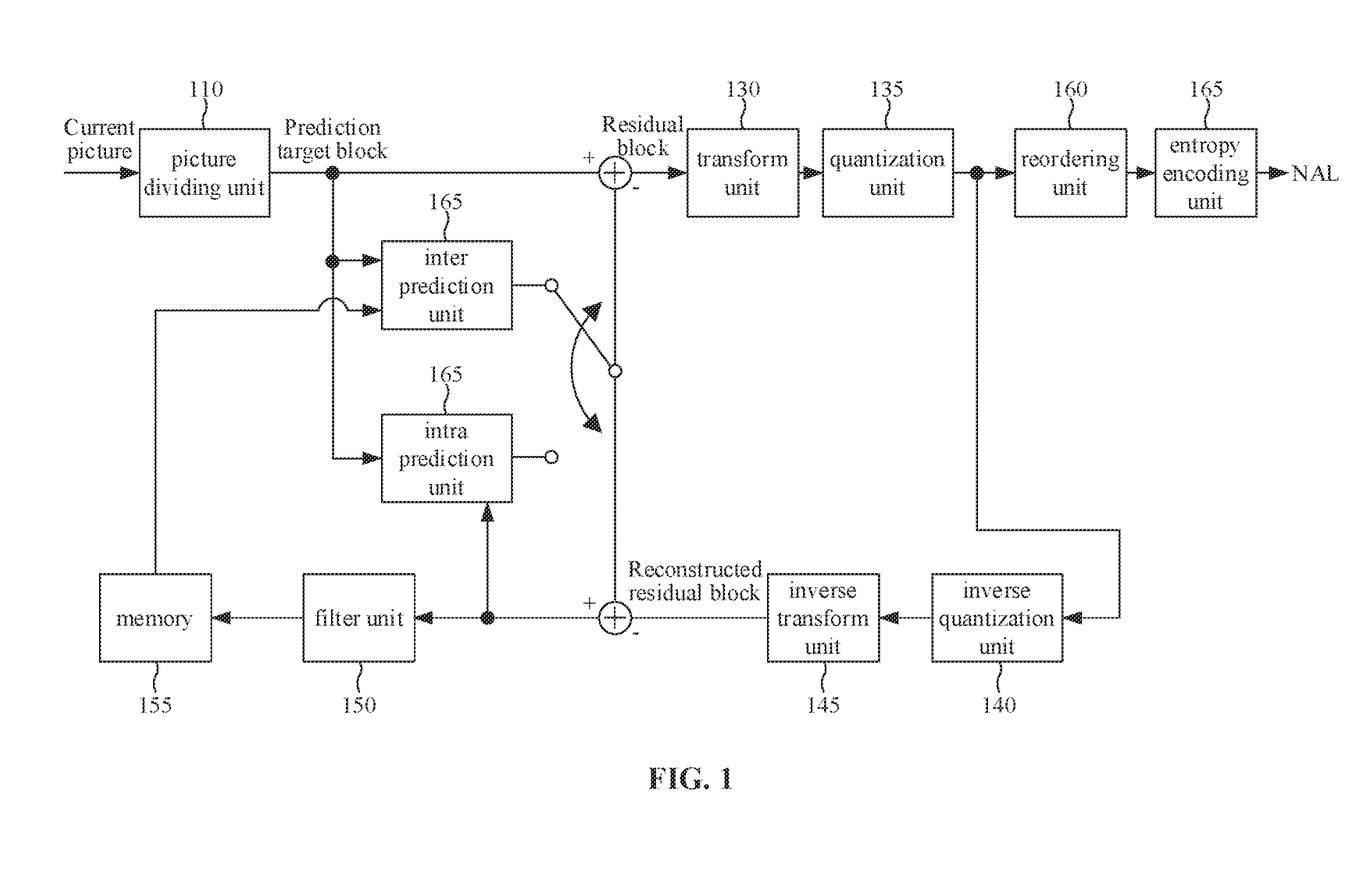
FIG. 1 is a block diagram illustrating an image encoding apparatus according to an embodiment of the present invention.

FIG. 1 is a block diagram illustrating an image encoding apparatus according to an embodiment of the present invention.

Referring to FIG. 1, the image encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the encoding apparatus, and does not mean that each element is made up of separate hardware or one software element. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide the input picture into at least one processing unit. In this case, the processing unit may be a prediction unit (PU), a transform unit (TU), or a coding unit (CU). The picture dividing unit 110 may divide one picture into a plurality of combinations of a coding unit, a prediction unit, and a transformation unit, and select one combination of a coding unit, a prediction unit, and a transformation unit based on a predetermined criterion (for example, a cost function) to encode the picture.

For example, one picture may be divided into a plurality of coding units. In order to divide a picture into the coding units, a recursive tree structure such as a quad tree structure may be used. One image or a maximum coding block (largest coding unit) as a root may be divided into other coding units, and may be divided with as many child nodes as the number of divided coding units. A coding unit that are no longer divided according to certain restrictions become a leaf node. That is, when it is assumed that only square division is possible for one coding unit, one coding unit may be divided into up to four different coding units.

In the embodiments of the invention, a coding unit may be used to refer to not only a unit of encoding but also a unit of decoding.

The prediction unit may be a block divided in a shape such as at least one square or rectangle of the same size within one coding unit, or one prediction unit among the prediction units divided within one coding unit may have a different shape and/or size from another prediction unit.

When a prediction unit that performs intra prediction based on a coding unit is not a minimum coding unit, intra prediction may be performed without dividing into a plurality of prediction units N×N.

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chrominance pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, advanced motion vector prediction (AMVP) mode, and intra block copy mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to predict luma information or the predicted luma signal information may be used to predict chroma information.

When the size of the prediction unit and the size of the transform unit are the same in performing intra prediction, intra prediction for the prediction unit may be performed based on a pixel on the left, a pixel on the top-left, and a pixel on the top of the prediction unit. However, when the size of the prediction unit and the size of the transform unit are different in performing intra prediction, intra prediction may be performed using a reference pixel determined based on the transform unit. Also, intra prediction using N×N division may be used for only the minimum coding unit.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information may be generated. The residual information is a difference between a predicted unit generated by the prediction units 120 and 125 and an original block of the prediction unit. The generated residual block may be input to the transform unit 130.

The transform unit 130 may transform the residual block including the residual information between the predicted unit generated by the prediction units 120 and 125 and the original block by using a transform type such as DCT (Discrete Cosine Transform), DST (Discrete Sine Transform), or KLT. Whether to apply DCT, DST, or KLT to transform the residual block may be determined based on intra prediction mode information of the prediction unit used to generate the residual block.

The quantization unit 135 may quantize values transformed into a frequency domain by the transform unit 130. A quantization coefficient may be changed depending on a block or importance of an image. Values output from the quantization unit 135 may be provided to the inverse quantization unit 140 and the rearrangement unit 160.

The rearrangement unit 160 may perform the rearrangement of the coefficient values for the quantized residual.

The rearrangement unit 160 may change coefficients of a two-dimensional (2D) block into coefficients of a one-dimensional (1D) vector through coefficient scanning method. For example, the rearrangement unit 160 may scan a DC coefficient to a coefficient in the high-frequency region using Zig-Zag scan method, and change it into a one-dimensional vector form. Depending on the size of the transform unit and the intra prediction mode, instead of zig-zag scan, a vertical scan that scans a two-dimensional block shape coefficient in a column direction and a horizontal scan that scans a two-dimensional block shape coefficient in a row direction may be used. That is, according to the size of the transform unit and the intra prediction mode, it is possible to determine which of a zig-zag scan, a vertical direction scan, and a horizontal direction scan is to be used.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information of a coding unit, prediction mode information, division unit information, prediction unit information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The inverse quantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the inverse quantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
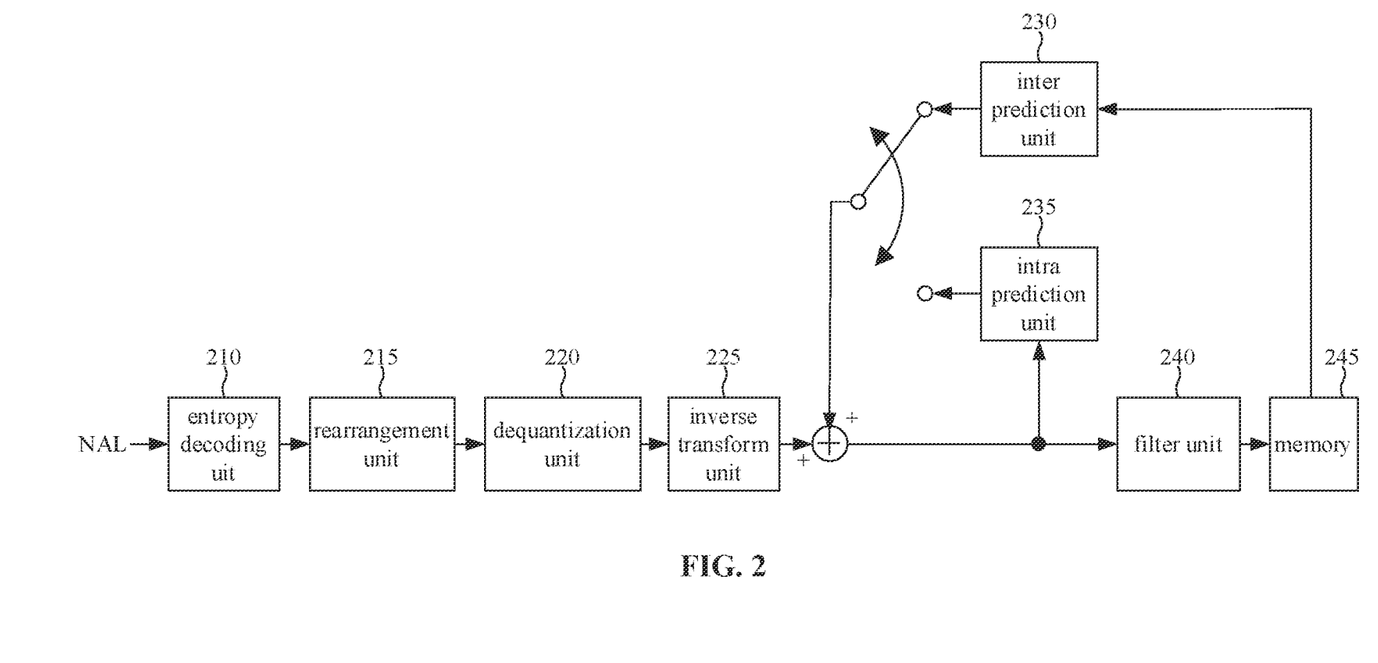
FIG. 2 is a block diagram illustrating an image decoding apparatus according an exemplary embodiment of the present invention.

FIG. 2 is a block diagram illustrating an image decoding apparatus according an exemplary embodiment of the present invention.

Referring to FIG. 2, the image decoding apparatus 200 may include an entropy decoding unit 210, a rearrangement unit 215, a dequantization unit 220, an inverse transform unit 225, prediction units 230 and 235, a filter unit 240, and a memory 245.

When an image bitstream is input from the image encoding apparatus, the input bitstream may be decoded in a procedure opposite to that of the image encoding apparatus.

The entropy decoding unit 210 may perform entropy decoding in a procedure opposite to that of performing entropy encoding in an entropy encoding unit of an image encoding apparatus. For example, various methods, such as exponential Golomb coding, CAVLC or CABAC, may be applied corresponding to the method performed by the image encoding apparatus.

The entropy decoding unit 210 may decode information associated with intra prediction and inter prediction performed by the encoding apparatus.

The rearrangement unit 215 may perform rearrangement on the bitstream entropy-decoded by the entropy decoding unit 210 based on the rearrangement method of the encoding apparatus. The rearrangement unit 215 may reconstruct and rearrange coefficients of a 1D vector into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter provided by the encoding apparatus and the rearranged coefficients of the block.

The inverse transform unit 225 may perform an inverse transform, that is, an inverse DCT, an inverse DST, and an inverse KLT, with respect to the transform performed by the transform unit, that is, DCT, DST, and KLT on the quantization result performed by the image encoding apparatus. The inverse transform may be performed based on a transmission unit determined by the image encoding apparatus. The inverse transform unit 225 of the image decoding apparatus may selectively perform a transform technique (e.g., DCT, DST, KLT) according to a plurality of pieces of information such as a prediction method, a size of a current block, and a prediction direction.

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245.

As described above, when the size of the prediction unit and the size of the transform unit are the same when intra prediction is performed in the same manner as the operation of the image encoding apparatus, intra prediction for the prediction unit may be performed based on a pixel on the left, a pixel on the top-left, and a pixel on the top of the prediction unit. However, when the size of the prediction unit and the size of the transform unit are different from each other when performing intra prediction, the intra prediction for the prediction unit may be performed using a reference pixel determined based on the transform unit. In addition, intra prediction using N×N division may be used for only the minimum coding unit.

The prediction units 230 and 235 may include a prediction unit determination unit, an inter prediction unit and an intra prediction unit. The prediction unit determination unit may receive a variety of information, such as prediction unit information, prediction mode information of an intra prediction method and motion prediction-related information of an inter prediction method, etc. from the entropy decoding unit 210, may determine a prediction unit for a current coding unit. The prediction unit determination unit may determine which of the inter prediction and the intra prediction is performed on the prediction unit. An inter prediction unit 230 may perform inter prediction on a current prediction unit on the basis of information on at least one picture among a previous picture and a subsequent picture of a current picture including the current prediction unit. Herein, an inter prediction unit 230 may use information necessary for inter prediction for the current prediction unit provided from the image encoding apparatus. The inter prediction may be performed on the basis of the information of the pre-reconstructed partial region in the current picture including the current prediction unit.

In order to perform inter prediction, it may be determined, in an unit of a coding unit, whether a motion prediction method for a prediction unit included in the coding unit is a skip mode, a merge mode, an AMVP mode or an intra block copy mode.

An intra prediction unit 235 may generate a prediction block on the basis of pixel information in a current picture. When a prediction unit is a prediction unit for which intra prediction is performed, intra prediction may be performed based on intra prediction mode information on the prediction unit provided from the image encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current prediction unit. AIS filtering may be performed on the reference pixels of the current block using the prediction mode for the prediction unit and information on the AIS filter provided from the image encoding apparatus. When the prediction mode for the current block is a mode not performing AIS filtering, the AIS filter may not be applied.

When the prediction mode for the prediction unit indicates a prediction mode of performing intra prediction on the basis of pixel values obtained by interpolating the reference pixels, the reference pixel interpolation unit may generate reference pixels in a unit of a fractional pixel less than an integer pixel (i.e., full pixel) by interpolating the reference pixels. When the prediction mode for the current prediction unit indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The image encoding apparatus may provide information on whether the deblocking filter is applied to a corresponding block or picture, and information on which of a strong filter and a weak filter is applied when the deblocking filter is used. The deblocking filter of the image decoding apparatus may be provided with information on the deblocking filter from the image encoding apparatus and may perform deblocking filtering on a corresponding block.

The offset unit may apply offset to the reconstructed picture on the basis of information on an offset type and offset value applied to the picture in the encoding process.

The ALF may be applied to a coding unit on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

As described above, in an embodiment of the present invention, for convenience of description, a coding unit is used as an encoding unit, but it may be an unit that performs not only encoding but also decoding.

Figure 3:
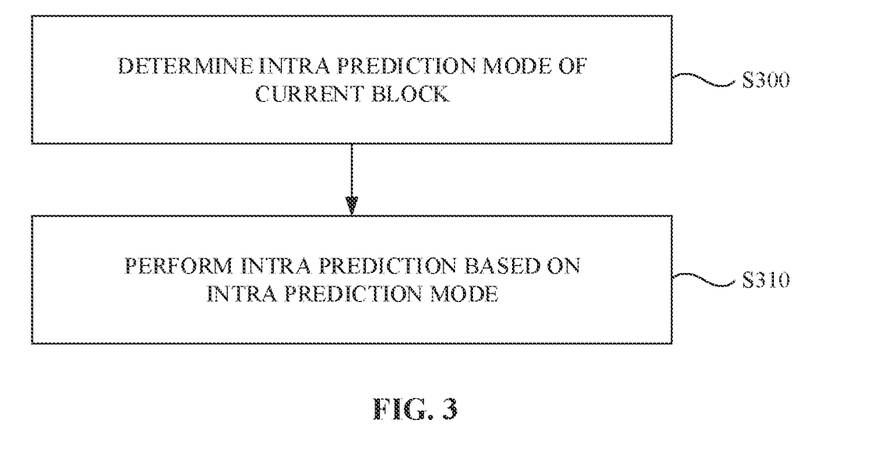
FIG. 3 illustrates an intra prediction method as an embodiment to which the present invention is applied.

FIG. 3 illustrates an intra prediction method as an embodiment to which the present invention is applied.

Referring to FIG. 3, an intra prediction mode of a current block may be determined (S300).

The current block is a concept including a luma block and a chroma block, and the intra prediction mode may be determined for each of a luma block and a chroma block. Hereinafter, it is assumed that the intra prediction mode pre-defined in the decoding apparatus is composed of a non-directional mode (Planar mode, DC mode) and 65 directional modes.

1. Derivation of Intra Prediction Mode of Luma Block

The intra prediction mode of the luma block may be derived based on a MPM list and a MPM index. The MPM list includes a plurality of MPMs, and the MPM may be determined based on an intra prediction mode of a neighboring block to the current block. The number of MPMs is r, and r may be an integer of 3, 4, 5, 6, or more.

For example, the MPM list may include at least one of an intra prediction mode of a neighboring block (modeA), modeA−n, modeA+n, or a default mode. The n value may be an integer of 1, 2, 3, 4 or more. The neighboring block may mean a block adjacent to the left and/or the top of the current block. The default mode may be at least one of a planar mode, a DC mode, or a pre-determined directional mode. The pre-determined directional mode may include at least one of a horizontal mode (modeV), a vertical mode (modeH), modeV−k, modeV+k, modeH−k, or modeH+k.

The MPM index may specify the same MPM as the intra prediction mode of the luma block among MPMs of the MPM list. That is, the MPM specified by the MPM index may be set as the intra prediction mode of the luma block.

Meanwhile, the MPM list may be generated based on a pre-determined higher coding block, and lower coding blocks belonging to the higher coding block may share the MPM list. Here, the lower coding block may correspond to the above-described current block or luma block. In this case, the MPM index may be signaled in units of higher coding blocks. In this case, a lower coding block belonging to the higher coding block may be predicted using the same intra prediction mode. Alternatively, the MPM index may be signaled for each of the lower coding blocks. In this case, the lower coding blocks share one MPM list, but may be predicted using different intra prediction modes from each other.

The higher coding block may be defined as a block of a node sharing the MPM list, and the lower coding block may be defined as a block of a leaf node that is no longer divided into smaller coding blocks.

(Embodiment 1) Sharing of the MPM list may be performed only when the higher coding block is greater than or equal to a pre-determined first threshold size. Here, the first threshold size may be defined as the minimum size of a block in which sharing of the MPM list is allowed. Conversely, the sharing of the MPM list may be performed only when the higher coding block is smaller than or equal to a pre-determined first threshold size. Here, the threshold size may be defined as the maximum size of a block in which sharing of the MPM list is allowed. Here, the first threshold size may be expressed in terms of width (W), height (H), W×H, W*H, and the like, and W and H may be integers of 8, 16, 32 or more.

(Embodiment 2) Sharing of the MPM list may be performed only when at least one of a plurality of lower coding blocks belonging to the higher coding block is less than or equal to a pre-determined second threshold size. Here, the second threshold size may be expressed in terms of width (W), height (H), W×H, W*H, and the like, and W and H may be integers of 4, 8, 16, 32 or more. However, the second threshold size may be set to be smaller than or equal to the first threshold size.

(Embodiment 3) Sharing of the MPM list may be adaptively performed in consideration of a division type of the higher coding block. For example, if the higher coding block is divided based on a quad tree (QT), sharing of the MPM list is allowed, otherwise, sharing of the MPM list may not be allowed. Alternatively, when the higher coding block is divided based on a binary tree (BT), sharing of the MPM list is allowed, and when the higher coding block is divided based on a ternary tree (TT), sharing of the MPM list may not be allowed.

Sharing of the MPM list may be selectively used based on any one of the above-described Embodiments 1 to 3, or sharing of the MPM list may be selectively used based on a combination of at least two of Embodiments 1 to 3.

In addition, information about whether the MPM list is shared, the size, shape, and division depth of the shared node of the MPM list may be signaled by the encoding apparatus. Sharing of the MPM list may be performed based on the signaled information.

2. Derivation of Intra Prediction Mode of Chroma Block

The intra prediction mode of the chroma block may be derived as shown in Table 1 or 2 below based on information (intra_chroma_pred_mode) signaled by the encoding apparatus.

TABLE 1

| intra_chroma_pred_mode[xCb][yCb] | IntraPredModeY[xCb + cbWidth/2][yCb + cbHeight/2] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

According to Table 1, the intra prediction mode of the chroma block may be determined based on the signaled information and the intra prediction mode of the luma block. In Table 1, mode66 means a diagonal mode in the top-right direction, mode50 means a vertical mode, mode18 means a horizontal mode, and mode1 means a DC mode. For example, when the value of the signaled information intra_chroma_pred_mode is 4, the intra prediction mode of the chroma block may be set to be the same as the intra prediction mode of the luma block.

TABLE 2

| intra_chroma_pred_mode[xCb][yCb] | IntraPredModeY[xCb + cbWidth/2][yCb + cbHeight/2] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Table 2 may be applied when inter-components reference-based prediction is allowed for a chroma block. Table 2 supports mode81, mode82, and mode83 as intra prediction modes of a chroma block, which correspond to inter-components reference-based prediction modes.

Referring to FIG. 3, based on the intra prediction mode derived in S300, intra prediction may be performed on a current block (S310).

The intra prediction may be performed in units of sub-blocks of the current block. To this end, the current block may be divided into a plurality of sub-blocks. The division method will be described in detail with reference to FIG. 4.

Meanwhile, when the derived intra prediction mode corresponds to an inter-components reference-based prediction mode, a chroma block may be predicted from a pre-reconstructed luma block, which will be described in detail with reference to FIG. 5.

Figure 4:
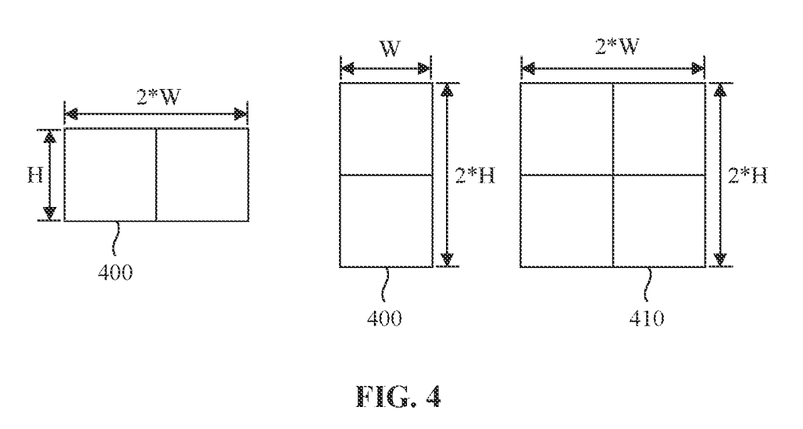
FIG. 4 illustrates an intra prediction method in units of sub-blocks as an embodiment to which the present invention is applied.

FIG. 4 illustrates an intra prediction method in units of sub-blocks as an embodiment to which the present invention is applied.

As described above, the current block may be divided into a plurality of sub-blocks. In this case, the current block may correspond to a leaf node. A leaf node may mean a coding block that is no longer divided into smaller coding blocks.

The division may be performed based on the size of the current block (Embodiment 1).

Referring to FIG. 4, when the size of the current block 400 is smaller than a pre-determined threshold size, the current block may be divided into two vertically or horizontally. Conversely, when the size of the current block 410 is greater than or equal to the threshold size, the current block may be divided into four vertically or horizontally.

The threshold size may be signaled by the encoding apparatus or may be a fixed value pre-defined in the decoding apparatus. For example, the threshold size is expressed as N×M, and N and M may be 4, 8, 16 or more. The N and M may be the same or may be set differently from each other.

Alternatively, if the size of the current block is smaller than the pre-determined threshold size, the current block may not be divided (non-split), otherwise, the current block may be divided into two or four.

The division may be performed based on the shape of the current block (Embodiment 2).

If the shape of the current block is a square, the current block may be divided into four, otherwise, the current block may be divided into two. Conversely, when the shape of the current block is a square, the current block may be divided into two, and otherwise, the current block may be divided into four.

Alternatively, if the shape of the current block is a square, the current block is divided into two or four, otherwise, the current block may not be divided. Conversely, if the shape of the current block is a square, the current block may not be divided, otherwise, the current block may be divided into two or four.

It may be divided by selectively applying any one of the above-described Embodiments 1 or 2, or may be divided based on a combination of the Embodiments 1 and 2.

The 2-division is dividing into two in either vertical or horizontal direction, and the 4-division may include dividing into four in either vertical or horizontal direction, or dividing into four in vertical and horizontal directions.

In the above embodiment, 2-division or 4-division is described, but the present invention is not limited thereto, and the current block may be divided into three in a vertical or horizontal direction. In this case, the ratio of the width or height may be (1:1:2), (1:2:1), or (2:1:1).

Information on whether to be divided into sub-block units, whether to be divided into four, a direction of division, and the number of divisions may be signaled by the encoding apparatus or variably determined by the decoding apparatus based on a pre-determined coding parameter. Here, the coding parameter is representative of a block size/shape, a division type (4-division, 2-division, 3-division), an intra prediction mode, a range/position of neighboring pixels for intra prediction, and a component types (e.g., luma, and chroma), a maximum/minimum size of a transform block, a transform type (e.g., transform skip, DCT2, DST7, DCT8), and the like.

Figure 5:
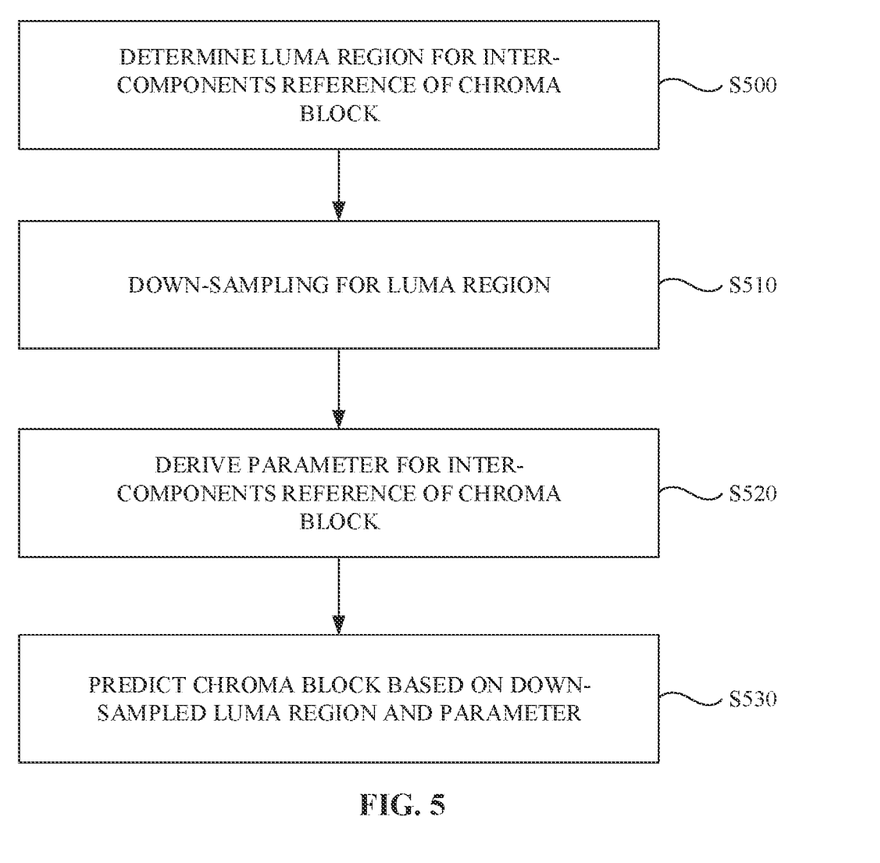
FIG. 5 illustrates an inter-components reference-based prediction method in an embodiment to which the present disclosure is applied.

FIG. 5 illustrates an inter-components reference-based prediction method in an embodiment to which the present disclosure is applied.

The current block may be divided into a luma block and a chroma block according to a component type. The chroma block may be predicted using the pixel of the reconstructed luma block. This is referred to as an inter-components reference. In this embodiment, it is assumed that the chroma block has a size of (nTbW×nTbH), and the luma block corresponding to the chroma block has a size of (2*nTbW× 2*nTbH).

Referring to FIG. 5, a luma region for inter-components reference of the chroma block may be specified (S500).

The luma region may include at least one of a luma block or a neighboring region adjacent to the luma block. Here, the luma block may be defined as a region including pixels pY[x][y] (x=0 . . . nTbW*2-1, y=0 . . . nTbH*2-1). The pixels may mean reconstructed values before the in-loop filter is applied.

The neighboring region may include at least one of a left neighboring region, a top neighboring region, or a top-left neighboring region. The left neighboring region may be set as a region including pixels pY[x][y] (x=-1 . . . -3, y=0 . . . 2*numSampL-1). The setting may be performed only when the value of numSampL is greater than 0. The top neighboring region may be set as a region including pixels pY[x][y] (x=0 . . . 2*numSampT-1, y=-1 . . . -3). The setting may be performed only when the value of numSampT is greater than 0. The top-left neighboring region may be set as a region including pixels pY[x][y] (x=-1, y=-1,-2). The setting may be performed only when the top-left region of the luma block is available.

The above-described numSampL and numSampT may be determined based on the intra prediction mode of the current block.

For example, when the intra prediction mode of the current block is INTRA_LT_CCLM, it may be derived based on Equation 9. Here, INTRA_LT_CCLM may mean a mode in which inter-components reference is performed based on left and top neighboring regions to the current block.

numSampT=availT?nTbW: 0 numSampL=availL?nTbH: 0    [Equation 1]

According to Equation 1, numSampT is derived as nTbW when the top neighboring region to the current block is available. Otherwise, numSampT may be derived as 0. Similarly, numSampL is derived as nTbH when the left neighboring region to the current block is available. Otherwise, numSampT may be derived as 0.

To the contrary, when the intra prediction mode of the current block is not INTRA_LT_CCLM, it may be derived based on Equation 2 below.

numSampT=(availT &&
  predModeIntra==INTRA_T_CCLM)?(nTbW+
  numTopRight): 0 numSampL=(availL &&
  predModeIntra==INTRA_L_CCLM)?(nTbH+
  numLeftBelow): 0    [Equation 2]

In Equation 2, INTRA_T_CCLM may refer to a mode in which inter-components reference is performed based on a top neighboring region to the current block. INTRA_L_CCLM may mean a mode in which inter-components reference is performed based on a left neighboring region to the current block. numTopRight may mean the number of all or some pixels belonging to a top-right neighboring region to the chroma block. Some pixels may refer to available pixels among pixels belonging to the lowest pixel row of the corresponding region. In an availability determination, whether the pixels are available may determined sequentially in a left to a right direction. This process may be performed until an unavailable pixel is found. numLeftBelow may mean the number of all or some pixels belonging to a bottom-left neighboring region to the chroma block. Some pixels may refer to available pixels among pixels belonging to the rightmost pixel line (column) of the corresponding region. In the availability determination, whether pixels are available may be determined sequentially in a top to a bottom direction. This process may be performed until an unavailable pixel is found.

Referring to FIG. 5, down-sampling may be performed on the luma region specified in S500 (S510).

The down-sampling may include at least one of 1. Down-sampling of the luma block, 2. Down-sampling of the left neighboring region to the luma block, or 3. Down-sampling of the top neighboring region to the luma block. This will be described in detail below.

1. Down-Sampling of Luma Block

Embodiment 1

The pixel pDsY[x][y] (x=0 . . . nTbW-1, y=0 . . . nTbH-1) of the down-sampled luma block may be derived based on a corresponding pixel pY[2*x] [2*y] of the luma block and the neighboring pixel. The neighboring pixel may mean at least one of a left neighboring pixel, a right neighboring pixel, a top neighboring pixel, or a bottom neighboring pixel to the corresponding pixel. For example, the pixel pDsY[x] [y] may be derived based on Equation 3 below.

$$pDsY[x][y]=(pY[2*x][2*y-1]+pY[2*x-1][2*y]+4*pY[2*x][2*y]+pY[2*x+1][2*y]+pY[2*x][2*y+1]+4)>>3 \qquad \text{[Equation 3]}$$

However, there may be a case where the left/top neighboring region to the current block are not available. When the left neighboring region to the current block is not available, the pixel pDsY[0][y] (y=1 . . . nTbH−1) of the down-sampled luma block may be derived based on the corresponding pixel pY[0][2*y] of the luma block and the neighboring pixel of the corresponding pixel. The neighboring pixel may mean at least one of the top neighboring pixel or the bottom neighboring pixel to the corresponding pixel. For example, pixel pDsY[0][y] (y=1 . . . nTbH−1) may be derived based on Equation 4 below.

$$pDsY[0][y]=(pY[0][2*y-1]+2*pY[0][2*y]+pY[0][2*y+1]+2)>>2 \qquad \text{[Equation 4]}$$

When the top neighboring region to the current block is not available, the pixel pDsY[x][0] (x=1 . . . nTbW−1) of the down-sampled luma block may be derived based on the corresponding pixel pY[2*x][0] of the luma block and the neighboring pixel of the corresponding pixel. The neighboring pixel may mean at least one of the left neighboring pixel or the right neighboring pixel to the corresponding pixel. For example, the pixel pDsY[x][0] (x=1 . . . nTbW−1) may be derived based on Equation 5 below.

$$pDsY[x][0]=(pY[2*x-1][0]+2*pY[2*x][0]+pY[2*x+1][0]+2)>>2 \qquad \text{[Equation 5]}$$

The pixel pDsY[0][0] of the down-sampled luma block may be derived based on the corresponding pixel pY[0][0] of the luma block and/or a neighboring pixel of the corresponding pixel. The position of the neighboring pixel may vary depending on whether left/top neighboring regions to the current block are available.

For example, when the left neighboring region is available but the top neighboring region is not available, pDsY [0][0] may be derived based on Equation 6 below.

$$pDsY[0][0]=(pY[-1][0]+2*pY[0][0]+pY[1][0]+2)>>2 \qquad \text{[Equation 6]}$$

To the contrary, when the left neighboring region is not available, but the top neighboring region is available, pDsY [0][0] may be derived based on Equation 7 below.

$$pDsY[0][0]=(pY[0][-1]+2*pY[0][0]+pY[0][1]+2)>>2 \qquad \text{[Equation 7]}$$

In another example, when both the left and top neighboring regions are not available, pDsY[0][0] may be set as the corresponding pixel pY[0][0] of the luma block.

Embodiment 2

The pixel pDsY[x][y] (x=0 . . . nTbW−1, y=0 . . . nTbH−1) of the down-sampled luma block may be derived based on the corresponding pixel pY[2*x][2*y] of the luma block and the neighboring pixel of the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pDsY[x][y] may be derived based on Equation 8 below.

$$pDsY[x][y]=(pY[2*x-1][2*y]+pY[2*x-1][2*y+1]+2*pY[2*x][2*y]+2*pY[2*x][2*y+1]+pY[2*x+1][2*y]+pY[2*x+1][2*y+1]+4)>>3 \qquad \text{[Equation 8]}$$

However, when the left neighboring region to the current block is not available, the pixel pDsY[0][y] (y=0 . . . nTbH−1) of the down-sampled luma block may be derived based on the corresponding pixel pY[0][2*y] of the luma block and a bottom neighboring pixel thereto. For example, the pixel pDsY[0][y] (y=0 . . . nTbH−1) may be derived based on Equation 9 below.

$$pDsY[0][y]=(pY[0][2*y]+pY[0][2*y+1]+1)>>1 \qquad \text{[Equation 9]}$$

Down-sampling of the luma block may be performed based on one of Embodiments 1 and 2 as described above. Here, one of Embodiments 1 and 2 may be selected based on a pre-determined flag. The flag may indicate whether the down-sampled luma pixel has the same position as that of the original luma pixel. For example, when the flag is a first value, the down-sampled luma pixel has the same position as that of the original luma pixel. To the contrary, when the flag is a second value, the down-sampled luma pixel has the same position as that of the original luma pixel in the horizontal direction, but has a position shifted by half pel in the vertical direction.

2. Down-Sampling of Left Neighboring Region to Luma Block

Embodiment 1

The pixel pLeftDsY[y] (y=0 . . . numSampL−1) of the down-sampled left neighboring region may be derived based on the corresponding pixel pY[−2][2*y] of the left neighboring region and a neighboring pixel of the corresponding pixel. The neighboring pixel may mean at least one of a left neighboring pixel, a right neighboring pixel, a top neighboring pixel, or a bottom neighboring pixel to the corresponding pixel. For example, the pixel pLeftDsY[y] may be derived based on Equation 10 below.

$$pLeftDsY[y]=(pY[-2][2*y-1]+pY[-3][2*y]+4*pY[-2][2*y]+pY[-1][2*y]+pY[-2][2*y+1]+4)>>3 \qquad \text{[Equation 10]}$$

However, when the top-left neighboring region to the current block is not available, the pixel pLeftDsY[0] of the down-sampled left neighboring region may be derived based on the corresponding pixel pY[−2][0] of the left neighboring region and a neighboring pixel of the corresponding pixel. The neighboring pixel may mean at least one of the left neighboring pixel or a right neighboring pixel to the corresponding pixel. For example, the pixel pLeftDsY[0] may be derived based on Equation 11 below.

$$pLeftDsY[0]=(pY[-3][0]+2*pY[-2][0]+pY[-1][0]+2)>>2 \qquad \text{[Equation 11]}$$

Embodiment 2

The pixel pLeftDsY[y] (y=0 . . . numSampL−1) of the down-sampled left neighboring region may be derived based on the corresponding pixel pY[−2][2*y] of the left neighboring region and a neighboring pixel around the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pLeftDsY[y] may be derived based on following Equation 12.

$$\text{pLeftDsY}[y]=(pY[-1][2*y]+pY[-1][2*y+1]+2*pY[-2]\\ [2*y]+2*pY[-2][2*y+1]+pY[-3][2*y]+pY[-3]\\ [2*y+1]+4)>>3 \quad \text{[Equation 12]}$$

Similarly, down-sampling of the left neighboring region may be performed based on one of Embodiments 1 and 2 as described above. Here, one of Embodiments 1 and 2 may be selected based on a pre-determined flag. The flag indicates whether the down-sampled luma pixel has the same position as that of the original luma pixel. This is the same as described above.

Down-sampling of the left neighboring region may be performed only when the numSampL value is greater than 0. When the numSampL value is greater than 0, it may mean that the left neighboring region to the current block is available, and the intra prediction mode of the current block is INTRA_LT_CCLM or INTRA_L_CCLM.

3. Down-Sampling of Top Neighboring Region to Luma Block

Embodiment 1

The pixel pTopDsY[x] (x=0 . . . numSampT−1) of the down-sampled top neighboring region may be derived in consideration of whether the top neighboring region belongs to a CTU different from a CTU to which the luma block belongs.

When the top neighboring region belongs to the same CTU as the luma block, the pixel pTopDsY[x] of the down-sampled top neighboring region may be derived based on the corresponding pixel pY[2*x][−2] of the top neighboring region and a neighboring pixel of the corresponding pixel. The neighboring pixel may mean at least one of a left neighboring pixel, a right neighboring pixel, a top neighboring pixel, or a bottom neighboring pixel to the corresponding pixel. For example, the pixel pTopDsY[x] may be derived based on Equation 13 below.

$$\text{pTopDsY}[x]=(pY[2*x][-3]+pY[2*x-1][-2]+4*pY\\ [2*x][-2]+pY[2*x+1][-2]+pY[2*x][-1]+4)>>3 \quad \text{[Equation 13]}$$

To the contrary, when the top neighboring region belongs to a CTU different from the luma block, the pixel pTopDsY[x] of the down-sampled top neighboring region may be derived based on the corresponding pixel pY[2*x][−1] of the top neighboring region and a neighboring pixel of the corresponding pixel. The neighboring pixel may mean at least one of the left neighboring pixel or the right neighboring pixel to the corresponding pixel. For example, the pixel pTopDsY[x] may be derived based on Equation 14 below.

$$\text{pTopDsY}[x]=(pY[2*x-1][-1]+2*pY[2*x][-1]+pY\\ [2*x+1][-1]+2)>>2 \quad \text{[Equation 14]}$$

Alternatively, when the top-left neighboring region to the current block is not available, the neighboring pixel may mean at least one of the top neighboring pixel or the bottom neighboring pixel to the corresponding pixel. For example, the pixel pTopDsY[0] may be derived based on Equation 15 below.

$$\text{pTopDsY}[0]=(pY[0][-3]+2*pY[0][-2]+pY[0]\\ [-1]+2)>>2 \quad \text{[Equation 15]}$$

Alternatively, when the top-left neighboring region to the current block is unavailable and the top neighboring region belongs to a CTU different from the luma block, the pixel pTopDsY[0] may be set as the pixel pY[0][−1] of the top neighboring region.

Embodiment 2

The pixel pTopDsY[x] (x=0 . . . numSampT−1) of the down-sampled top neighboring region may be derived in consideration of whether the top neighboring region belongs to a CTU different from the luma block.

When the top neighboring region belongs to the same CTU as the luma block, the pixel pTopDsY[x] of the down-sampled top neighboring region may be derived based on the corresponding pixel pY[2*x][−2] of the top neighboring region and a neighboring pixel of the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pTopDsY[x] may be derived based on Equation 16 below.

$$\text{pTopDsY}[x]=(pY[2*x-1][-2]+pY[2*x-1][-1]+2*pY\\ [2*x][-2]+2*pY[2*x][-1]+pY[2*x+1][-2]+pY\\ [2*x+1][-1]+4)>>3 \quad \text{[Equation 16]}$$

To the contrary, when the top neighboring region belongs to a CTU different from the luma block, the pixel pTopDsY[x] of the down-sampled top neighboring region may be derived based on the corresponding pixel pY[2*x][−1] of the top neighboring region and a neighboring pixel of the corresponding pixel. The neighboring pixel may mean at least one of the left neighboring pixel or the right neighboring pixel to the corresponding pixel. For example, the pixel pTopDsY[x] may be derived based on Equation 17 below.

$$\text{pTopDsY}[x]=(pY[2*x-1][-1]+2*pY[2*x][-1]+pY\\ [2*x+1][-1]+2)>>2 \quad \text{[Equation 17]}$$

Alternatively, when the top-left neighboring region to the current block is not available, the neighboring pixel may mean at least one of the top neighboring pixel or the bottom neighboring pixel to the corresponding pixel. For example, the pixel pTopDsY[0] may be derived based on Equation 18 below.

$$\text{pTopDsY}[0]=(pY[0][-2]+pY[0][-1]+1)>>1 \quad \text{[Equation 18]}$$

Alternatively, when the top-left neighboring region to the current block is unavailable and the top neighboring region belongs to a CTU different from the luma block, the pixel pTopDsY[0] may be set as pixel pY[0][−1] of the top neighboring region.

In the similar manner, down-sampling of the top neighboring region may be performed based on one of Embodiments 1 and 2 as described above. Here, one of Embodiments 1 and 2 may be selected based on a pre-determined flag. The flag indicates whether the down-sampled luma pixel has the same position as that of the original luma pixel. This is the same as described above.

In one example, down-sampling of the top neighboring region may be performed only when the numSampT value is greater than 0. When the numSampT value is greater than 0, it may mean that the top neighboring region to the current block is available, and the intra prediction mode of the current block is INTRA_LT_CCLM or INTRA_T_CCLM.

A parameter for inter-components reference of the chroma block may be derived (S520).

The parameter may be determined in consideration of the intra prediction mode of the current block. The parameter may be derived using at least one of a pixel of the luma region or a pixel of top/left neighboring regions to a chroma block. Here, the luma region may include at least one of the luma block or the top/left neighboring regions to the luma block. The luma region may mean a region to which the aforementioned down-sampling is applied.

The chroma block may be predicted based on the down-sampled luma block and the parameter (S530).

The number of parameters applied to the luma block may be k. Here, k may be an integer of 1, 2, 3 or more. At least one of the parameters may be a scaling factor applied to a pixel value of the luma block. The parameters may further include an offset parameter applied to the pixel value or the scaled pixel value of the luma block.

The methods according to the present invention may be implemented in the form of program instructions that can be executed through various computer means and recorded in a computer-readable medium. The computer-readable medium may include program instructions, data files, data structures, and the like alone or in combination. The program instructions recorded on the computer-readable medium may be specially designed and configured for the present invention, or may be known and usable to those skilled in the field of computer software.

Examples of computer-readable media may include hardware devices specially configured to store and execute program instructions, such as ROM, RAM, flash memory, and the like. Examples of program instructions may include high-level language codes that can be executed by a computer using an interpreter or the like as well as machine language codes such as those produced by a compiler. The above-described hardware device may be configured to operate as at least one software module to perform the operation of the present invention, and vice versa.

In addition, the above-described method or apparatus may be implemented by combining all or part of its configuration or function, or may be implemented separately.

Although the above has been described with reference to the preferred embodiments of the present invention, those skilled in the art will variously modify and change the present invention within the scope not departing from the spirit and scope of the present invention described in the following claims.

INDUSTRIAL AVAILABILITY

The present invention may be used to encode/decode an image.

The invention claimed is:

1. A method of decoding an image, comprising:
   determining an intra prediction mode of a current block; and
   performing intra prediction on the current block based on the intra prediction mode, wherein the intra prediction mode of the current block is determined for each of a luma block and a chroma block, respectively,
   wherein the intra prediction mode of the luma block is derived based on an MPM (Most Probable Mode) list and an MPM index, and
   wherein the current block is divided into a plurality of sub-blocks based on at least one of a size or a shape of the current block,
   when the size of the current block is smaller than a pre-determined threshold size, the current block is divided into two vertically or horizontally.

2. The method of claim 1, wherein the current block is one of a plurality of lower coding blocks belonging to a higher coding block, and
   wherein the plurality of lower coding blocks belonging to the higher coding block share the MPM list.

3. The method of claim 1, wherein performing the intra prediction comprises:
   specifying a luma region for inter-components reference of the chroma block;
   performing down-sampling for the luma region;
   deriving a parameter for the inter-components reference of the chroma block; and
   predicting the chroma block based on the down-sampled luma region and the parameter.

4. The method of claim 1, wherein,
   the MPM list includes an intra prediction mode of a neighboring block (ModeA), ModeA+n, and ModeA−n.

5. The method of claim 1, wherein,
   when the size of the current block is greater than or equal to the pre-determined threshold size, the current block is divided into four vertically or horizontally.

6. A method of encoding an image, comprising:
   determining an intra prediction mode of a current block;
   performing intra prediction on the current block based on the intra prediction mode, wherein the intra prediction mode of the current block is determined for each of a luma block and a chroma block, respectively; and
   encoding an MPM (Most Probable Mode) index into a bitstream,
   wherein the MPM index is derived based on the intra prediction mode of the luma block and an MPM list, and
   wherein the current block is divided into a plurality of sub-blocks based on at least one of a size or a shape of the current block,
   when the size of the current block is smaller than a pre-determined threshold size, the current block is divided into two vertically or horizontally.

7. The method of claim 6, wherein the current block is one of a plurality of lower coding blocks belonging to a higher coding block, and
   wherein the plurality of lower coding blocks belonging to the higher coding block share the MPM list.

8. The method of claim 6, wherein performing the intra prediction comprises:
   specifying a luma region for inter-components reference of the chroma block;
   performing down-sampling for the luma region;
   deriving a parameter for the inter-components reference of the chroma block; and
   predicting the chroma block based on the down-sampled luma region and the parameter.

9. The method of claim 6, wherein,
   the MPM list includes an intra prediction mode of a neighboring block (ModeA), ModeA+n, and ModeA−n.

10. The method of claim 6, wherein,
    when the size of the current block is greater than or equal to the pre-determined threshold size, the current block is divided into four vertically or horizontally.

11. A decoder, comprising a memory and a processor, wherein
    the memory is configured to store computer programs capable of running in the processor; and
    the processor is configured to run the computer programs to execute:
    determining an intra prediction mode of a current block; and
    performing intra prediction on the current block based on the intra prediction mode, wherein the intra prediction mode of the current block is determined for each of a luma block and a chroma block, respectively, wherein the intra prediction mode of the luma block is derived based on an MPM (Most Probable Mode) list and an MPM index, and wherein the current block is divided into a plurality of sub-blocks based on at least one of a size or a shape of the current block, when the size of the current block is smaller than a pre-determined threshold size, the current block is divided into two vertically or horizontally.

12. The decoder of claim 11, wherein the current block is one of a plurality of lower coding blocks belonging to a higher coding block, and wherein the plurality of lower coding blocks belonging to the higher coding block share the MPM list.

13. The decoder of claim 11, wherein the processor is further configured to run the computer programs to execute:

specifying a luma region for inter-components reference of the chroma block;

performing down-sampling for the luma region;

deriving a parameter for the inter-components reference of the chroma block; and predicting the chroma block based on the down-sampled luma region and the parameter.

14. The decoder of claim 11, wherein, the MPM list includes an intra prediction mode of a neighboring block (ModeA), ModeA+n, and ModeA−n.

15. The decoder of claim 11, wherein, when the size of the current block is greater than or equal to the pre-determined threshold size, the current block is divided into four vertically or horizontally.

16. An encoder, comprising a memory and a processor, wherein the memory is configured to store computer programs capable of running in the processor; and the processor is configured to run the computer programs to execute:

determining an intra prediction mode of a current block;

performing intra prediction on the current block based on the intra prediction mode, wherein the intra prediction mode of the current block is determined for each of a luma block and a chroma block, respectively; and encoding an MPM (Most Probable Mode) index into a bitstream, wherein the MPM index is derived based on the intra prediction mode of the luma block and an MPM list, and wherein the current block is divided into a plurality of sub-blocks based on at least one of a size or a shape of the current block, when the size of the current block is smaller than a pre-determined threshold size, the current block is divided into two vertically or horizontally.

17. The encoder of claim 16, wherein the current block is one of a plurality of lower coding blocks belonging to a higher coding block, and wherein the plurality of lower coding blocks belonging to the higher coding block share the MPM list.

18. The encoder of claim 16, wherein the processor is further configured to run the computer programs to execute:

specifying a luma region for inter-components reference of the chroma block;

performing down-sampling for the luma region;

deriving a parameter for the inter-components reference of the chroma block; and predicting the chroma block based on the down-sampled luma region and the parameter.

19. The encoder of claim 16, wherein, the MPM list includes an intra prediction mode of a neighboring block (ModeA), ModeA+n, and ModeA−n.

20. The encoder of claim 16, wherein, when the size of the current block is greater than or equal to the pre-determined threshold size, the current block is divided into four vertically or horizontally.

* * * * *